(12) United States Patent
Lucke et al.

(10) Patent No.: US 10,773,586 B2
(45) Date of Patent: Sep. 15, 2020

(54) MOTOR VEHICLE WITH A COOLING SYSTEM

(71) Applicant: Volkswagen Aktiengesellschaft, Wolfsburg (DE)

(72) Inventors: Stefan Lucke, Wolfsburg (DE); Tobias Schulze, Ribbesbüttel (DE); Robert Stelzner, Wolfsburg (DE); Ulf Reuters, Eschede (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 49 days.

(21) Appl. No.: 16/124,640

(22) Filed: Sep. 7, 2018

(65) Prior Publication Data

US 2019/0070951 A1     Mar. 7, 2019

(30) Foreign Application Priority Data

Sep. 7, 2017 (DE) .................. 10 2017 120 615

(51) Int. Cl.
*H01M 10/6568* (2014.01)
*H01M 10/625* (2014.01)
(Continued)

(52) U.S. Cl.
CPC .......... *B60K 11/02* (2013.01); *B60H 1/00278* (2013.01); *B60H 1/00385* (2013.01);
(Continued)

(58) Field of Classification Search
None
See application file for complete search history.

(56) References Cited

U.S. PATENT DOCUMENTS

| 2005/0133215 | A1  | 6/2005 | Ziehr et al. |
| 2014/0216709 | A1* | 8/2014 | Smith ................ B60H 1/00278 |
|              |     |        | 165/287 |

(Continued)

FOREIGN PATENT DOCUMENTS

| CN | 106 585 414 A     | 4/2017 |
| DE | 10 2007 004 979 A1 | 8/2008 |

(Continued)

OTHER PUBLICATIONS

Search report for European Patent Application No. 18 19 1416.9, dated Feb. 4, 2019.
(Continued)

*Primary Examiner* — Scott J. Chmielecki
(74) *Attorney, Agent, or Firm* — Pearl Cohen Zedek Latzer Baratz LLP

(57) ABSTRACT

A motor vehicle with a cooling system, comprising an electric traction motor, an ambient heat exchanger, a bypass to the ambient heat exchanger, a traction battery, a coolant heater, a coolant-refrigerant heat exchanger of an air conditioner, a first coolant pump, and a second coolant pump that are directly or indirectly connected or connectable to one another via coolant lines and a distribution system, characterized in that, in a first functional position of the distribution system, coolant is conveyable, by means of the first coolant pump, in a first coolant circuit that includes the traction motor, the bypass to the ambient heat exchanger, and the coolant-refrigerant heat exchanger, and coolant is conveyable, by means of the second coolant pump, in a second coolant circuit, separate from the first coolant circuit, that includes the traction battery and the coolant heater, and in a second functional position of the distribution system, coolant is conveyable, by means of the first coolant pump, in a third coolant circuit that includes the traction motor and the ambient heat exchanger, and coolant is conveyable, by (Continued)

means of the second coolant pump, in a fourth coolant circuit, separate from the third coolant circuit, that includes the traction battery and the coolant-refrigerant heat exchanger.

13 Claims, 5 Drawing Sheets

(51) Int. Cl.
  *B60K 11/02* (2006.01)
  *B60L 58/26* (2019.01)
  *B60H 1/32* (2006.01)
  *B60H 1/00* (2006.01)
  *H01M 10/663* (2014.01)

(52) U.S. Cl.
  CPC ....... *B60H 1/00392* (2013.01); *B60H 1/3204* (2013.01); *B60H 1/32281* (2019.05); *B60L 58/26* (2019.02); *H01M 10/625* (2015.04); *H01M 10/6568* (2015.04); *H01M 10/663* (2015.04); *B60H 2001/00307* (2013.01); *H01M 2220/20* (2013.01)

(56) References Cited

U.S. PATENT DOCUMENTS

| | | |
|---|---|---|
| 2015/0333379 A1 | 11/2015 | Janarthanam et al. |
| 2016/0107505 A1* | 4/2016 | Johnston ............ B60H 1/00914 165/202 |
| 2017/0158081 A1* | 6/2017 | Kim ........................ B60L 58/27 |
| 2018/0178615 A1 | 6/2018 | Xia et al. |
| 2018/0236842 A1 | 8/2018 | Allgäuer et al. |

FOREIGN PATENT DOCUMENTS

| | | |
|---|---|---|
| DE | 10 2012 024 080 A1 | 3/2014 |
| DE | 10 2012 108 043 A1 | 5/2014 |
| DE | 10 2014 201 747 A1 | 8/2014 |
| DE | 10 2015 208 862 A1 | 11/2015 |
| DE | 10 2015 101 186 A1 | 7/2016 |
| DE | 10 2015 220 623 A1 | 4/2017 |
| WO | WO 2014/086443 A1 | 6/2014 |

OTHER PUBLICATIONS

Search report for German Patent Application No. 10 2017 120 615.9, dated May 22, 2018.

* cited by examiner

MOTOR VEHICLE WITH A COOLING SYSTEM

CROSS-REFERENCE TO RELATED APPLICATIONS

This application claims priority from German Patent Application No. 10 2017 120 615.9, filed Sep. 7, 2017, the entire contents of which are incorporated herein in its entirety.

FIELD OF THE INVENTION

The invention relates to an electric motor vehicle, i.e., a motor vehicle that has an electric traction motor, with a cooling system.

BACKGROUND OF THE INVENTION

The cooling system of an electric motor vehicle, regardless of whether it is designed in the form of a hybrid vehicle or as a purely electric vehicle, differs significantly from a cooling system of a motor vehicle that is driven solely by means of an internal combustion engine. This is true not only because components of the electric traction system, in particular the electric traction motor and a traction battery provided for supplying this traction motor with electrical energy, must be cooled, perhaps additionally, in such an electric motor vehicle, but also in particular because for these components of the electric traction system, different temperature levels must often be maintained by means of the cooling system. For example, it may be necessary for an intended operating temperature range for the traction battery to be far below the intended operating temperature range for the electric traction motor, which may require them to be cooled by separate coolant flows at different coolant temperatures.

Cooling systems for electric motor vehicles are known from DE 10 2007 004 979 A1, DE 10 2012 024 080 A1, DE 10 2015 101 186 A1, DE 10 2015 208 862 A1, and DE 10 2015 220 623 A1, for example. However, the cooling systems disclosed therein are functionally limited or have relatively complicated designs.

The object of the invention is to provide a cooling system for an electric motor vehicle that has a preferably simple design.

SUMMARY OF THE INVENTION

This object is achieved by means of a cooling system of a motor vehicle according to independent claims. A method for operating such a motor vehicle is the subject matter of independent claims. Advantageous embodiments of the motor vehicle according to the invention and advantageous embodiments of the method according to the invention are the subject matter of the further patent claims and/or result from the following description of the invention.

According to the invention, an electric motor vehicle with a cooling system is provided which includes at least one electric traction motor (or one or more cooling channels thereof), an ambient heat exchanger, a bypass for the ambient heat exchanger, a traction battery (or one or more cooling channels thereof), a preferably electric coolant heater, a coolant-refrigerant heat exchanger of an air conditioner, a first coolant pump, and a second coolant pump that are directly or indirectly fluid conductively connected or connectable to one another via coolant lines and a distribution system.

An "ambient heat exchanger" is understood to mean a heat exchanger in which cooling of coolant of the cooling system can take place by transfer of thermal energy to ambient air that flows through and/or around the heat exchanger.

An "air conditioner" is understood to mean a device via which air that is to be supplied to an interior of the motor vehicle may be temperature-controlled, which may require heating as well as cooling of the air. The air conditioner may preferably be designed in the form of a cycle apparatus for implementing a thermodynamic cycle, and for this purpose integrates at least one compressor for compressing the refrigerant, which is gaseous at that time, a condenser for liquefying the previously gaseous refrigerant, with emission of thermal energy, a throttle for reducing the pressure of the refrigerant, which is liquid at that time, and an evaporator for evaporating the previously liquid refrigerant, with absorption of thermal energy, into a circulation system that accommodates a refrigerant. In addition, such a cycle apparatus of the air conditioner may also include a pump for conveying the refrigerant within the circulation system. Furthermore, it may be advantageous for the air conditioner to additionally include a preferably electric auxiliary heater whose thermal energy is transferable directly or indirectly, i.e., via the refrigerant, to the air that is to be supplied to the interior of the motor vehicle. In one embodiment of the air conditioner that includes such a cycle apparatus, it may be provided in particular that the coolant-refrigerant heat exchanger integrated into the cooling system is the evaporator of the cycle apparatus.

The fluid-conducting connection between the stated components of a motor vehicle according to the invention is provided in such a way that in a first functional position of the distribution system, (in particular liquid) coolant is conveyable, by means of the first coolant pump, in a first coolant circuit that includes the traction motor, the bypass to the ambient heat exchanger, and the coolant-refrigerant heat exchanger. Accordingly, corresponding to a method according to the invention, in the first functional position of the distribution system it may be provided to utilize thermal energy, which in the coolant-refrigerant heat exchanger is transferred from the coolant flowing through the first coolant circuit to a refrigerant of the air conditioner for heating an interior of the motor vehicle. In this way, either an auxiliary heater of the air conditioner may become unnecessary, or the heat output to be applied by the auxiliary heater for heating the air to be supplied to the interior of the motor vehicle may be kept low, which on the one hand allows the auxiliary heater to have relatively small dimensions and thus to be light and inexpensive, and on the other hand allows energy that is to be supplied to the auxiliary heater for conversion into thermal energy to be kept low. In an embodiment of the auxiliary heater as an electric heater, this may have particularly advantageous effects on the electric cruising range of the motor vehicle.

In one embodiment of the air conditioner that includes at least a cycle apparatus, it may be provided to operate the air conditioner in the first functional position of the distribution system as a heat pump, so that the waste heat of the first coolant circuit that is absorbed in the coolant-refrigerant heat exchanger, together with in particular energy (overpressure) that is introduced into the refrigerant from the compressor, as useful heat in the condenser is transferred to the air that is provided for controlling the temperature of the interior of the motor vehicle. Since the thermal energy (waste heat) that is absorbed by the coolant when flowing through the first coolant circuit is preferably to be utilized solely for heating the interior of the motor vehicle, it is provided that the first coolant circuit integrates the bypass to the ambient heat exchanger, so that the coolant is at least partially, and preferably completely, led across this bypass. Accordingly, the ambient heat exchanger itself may preferably not be integrated into the first coolant circuit, and therefore coolant also does not flow through it.

In addition, in the first functional position of the distribution system it is provided that by means of the second coolant pump, coolant is conveyable in a second coolant circuit, separate from the first coolant circuit, that includes (preferably in addition to the second coolant pump) solely the traction battery and the coolant heater. In one refinement of the method according to the invention, this makes it possible to control the temperature of (in particular solely) the traction battery by means of the coolant heater, as the result of which the coolant heater may be heated, preferably rapidly and with the least possible use of thermal energy to be generated by the coolant heater, until an intended operating temperature is reached.

It may be meaningful to operate the motor vehicle or the cooling system, based on the first functional position of the distribution system, in particular directly or shortly after a cold start of the motor vehicle, i.e., a start-up after the components of the motor vehicle have essentially completely cooled to ambient temperature, at the same time at relatively low ambient temperatures, in order to achieve preferably rapid and energetically advantageous heating of the interior of the motor vehicle and of the traction battery.

According to the invention, "separation" of various cooling circuits of the cooling system of a motor vehicle according to the invention is understood to mean that no relevant exchange of coolant takes place between these cooling circuits during operation of the cooling system, i.e., when coolant is conveyed by means of the coolant pumps.

According to the invention, in addition a second functional position of the distribution system is provided in which on the one hand coolant is conveyable, by means of the first coolant pump, in a third coolant circuit that includes the traction motor and the ambient heat exchanger, and on the other hand coolant is conveyable, by means of the second coolant pump, in a fourth coolant circuit, separate from the third coolant circuit, that includes the traction battery and the coolant-refrigerant heat exchanger. Thus, in the method according to the invention, in the second functional position of the distribution system it may be provided to utilize thermal energy, transferred in the coolant-refrigerant heat exchanger from the coolant flowing through the fourth coolant circuit to the refrigerant of the air conditioner, for cooling the traction battery; i.e., active cooling of the traction battery is then provided by means of the air conditioner via the coolant circulating in the fourth coolant circuit. Accordingly, in one embodiment of the air conditioner that at least includes a cycle apparatus, it may be provided to operate the air conditioner in the second functional position of the distribution system as a refrigeration unit. At the same time, it may be provided that waste heat that is transferred from the components, in particular the traction motor, that are integrated into the third coolant circuit, to the coolant circulating therein is discharged from the cooling system or the motor vehicle via the ambient heat exchanger, which is then at least partially, preferably completely, integrated into the coolant circulation.

An operation of the motor vehicle or the cooling system based on the second functional position of the distribution system may be provided in particular after all components that are integrated into the cooling system, and for which a cooling effect is to be achieved, at least temporarily, by means of the cooling system have in each case reached a defined operating temperature range. As a supplement, it may also be provided that the second functional position of the distribution system is set only when the temperature of the coolant upstream from the traction battery is above a defined limit temperature or a defined limit temperature range, for example between 25° C. and 35° C., wherein the specific limit temperature within this range may vary in particular as a function of the load under which the traction motor is operated. A sufficient cooling effect for the traction battery may then be ensured by the active cooling of the traction battery by means of the air conditioner.

A particularly simple and therefore advantageous interconnection of the components of the cooling system of a motor vehicle according to the invention may be achieved when a main circuit that integrates in series at least the traction motor, the combination of the ambient heat exchanger and the associated bypass, the traction battery, the first coolant pump, and the second coolant pump is provided. In addition, a first short-circuit line that integrates the coolant heater and that bridges a section of the main circuit that integrates the traction battery and the second coolant pump, as well as a second short-circuit line that integrates the coolant-refrigerant heat exchanger and that bridges a section of the main circuit that integrates the traction battery, the second coolant pump, and the branches to the first short-circuit line, are then provided. To be able to achieve sufficient control of a flow of the coolant in various sections of the main circuit as well as in the first short-circuit line and/or the second short-circuit line, a distribution device of the distribution system is additionally integrated into at least one branch of the main circuit to the first short-circuit line and/or to the second short-circuit line. The distribution device may preferably be designed in the form of a valve, in particular in the form of a switching valve and/or a 3/2-way valve, that is actively controllable by means of a control device of the motor vehicle.

According to one advantageous embodiment of a motor vehicle according to the invention, it may be provided that in a third functional position of the distribution system, coolant is conveyable, by means of the first coolant pump, in a fifth coolant circuit that (optionally solely) includes the traction motor and the bypass to the ambient heat exchanger. In addition, coolant is then to be conveyable in the second coolant circuit, which is separate from the fifth coolant circuit, by means of the second coolant pump. Accordingly, it may be provided that an operation of the cooling system based on the third functional position of the distribution system differs from that based on the first functional position in that no waste heat of the cooling system is to be utilized for heating the interior of the motor vehicle. Therefore, it may then also be provided that the coolant flowing through the fifth coolant circuit does not flow through or around the coolant-refrigerant heat exchanger, in order to avoid an increased flow resistance that would be associated with such flowthrough. For this purpose, a cooling system according to the invention may advantageously include a third short-circuit line that bridges a section of the main circuit that (preferably solely) integrates the traction battery, the second coolant pump, the branches to the first short-circuit line, and the branches to the second short-circuit line. To allow control of the coolant via this third short-circuit line, a distribution device of the distribution system may also preferably be integrated into at least one branch to the third short-circuit line. This distribution device as well may preferably be designed in the form of a valve, in particular in the form of a switching valve and/or a 3/2-way valve, that is actively controllable by means of a control device of the motor vehicle.

In principle, for the embodiment of the cooling system of a motor vehicle according to the invention, only three distribution devices of the distribution system, in particular two switching valves (preferably 3/2-way switching valves), and a thermostat valve distributing coolant to the ambient heat exchanger and/or the associated bypass, as needed, may be sufficient overall.

According to an alternative third functional position, flow through the second short-circuit line, which includes the coolant-refrigerant heat exchanger, is possible instead of through the third short-circuit line, which may possibly not be present, without utilizing thermal energy that would possibly be transferred to a small extent from the coolant to the refrigerant, for heating the air to be supplied to the interior of the motor vehicle, for example by then not operating a cycle apparatus of the air conditioner.

An operation of the motor vehicle or of the cooling system based on the third functional position of the distribution system may be meaningful in particular directly or shortly after a cold start of the motor vehicle and at relatively low ambient temperatures, since in that case, heating of the traction battery by means of the coolant heater via the coolant that is separately conveyed in the second coolant circuit is then meaningful. In contrast, not utilizing waste heat of the fifth coolant circuit for heating air to be supplied to the interior of the motor vehicle according to the third functional position may be justified in particular due to the fact that, directly after a cold start, heating of the coolant flowing through the fifth coolant circuit is to initially take place before sufficient and preferably constant heat transfer to the refrigerant in the coolant-refrigerant heat exchanger (according to an operation based on the first functional position of the distribution system) can take place by means of this coolant. It may be provided that after a cold start of the motor vehicle, the cooling system is initially operated based on the third functional position before a switch is made to an operation based on the first functional position. However, direct operation of the cooling system based on the first functional position is also possible after a cold start of the motor vehicle.

According to another preferred advantageous embodiment of a motor vehicle according to the invention, it may be provided that in a fourth functional position of the distribution system, coolant is conveyable, by means of the first coolant pump and the second coolant pump, in a sixth coolant circuit that includes the traction motor, the ambient heat exchanger, and the traction battery. Accordingly, it may be provided to integrate all components that are to be cooled into a shared coolant circuit, namely, the sixth coolant circuit, so that the same coolant may flow through them. This may be meaningful in particular when this coolant has a temperature that is not yet low enough for an existing cooling power requirement of the traction battery, or that may be adequately maintained due to the flow through the ambient heat exchanger. Accordingly, it is not (yet) necessary to divide the cooling system into at least two separate cooling circuits according to an operation based on the second functional position of the distribution system. This may be possible in particular when, during flow through the (coolant channels of the) traction motor, absorbed thermal energy is at least partially discharged back into the ambient heat exchanger, and only afterwards does the coolant, which is then relatively cold, flow through the (coolant channels of the) traction battery. Switching over an operation of the cooling system based on the fourth functional position to an operation of the cooling system based on the second functional position may be necessary in particular when the temperature of the coolant upstream from the traction battery is above a limit value or a limit temperature range, for example between 25° C. and 35° C., wherein the specific limit temperature within this range may vary in particular as a function of the load under which the traction motor is operated, and therefore sufficient cooling power for the traction battery cannot be achieved by means of the ambient heat exchanger and the coolant flowing through the sixth coolant circuit.

According to another preferred advantageous embodiment of a motor vehicle according to the invention, it may be provided that in a fifth functional position of the distribution system, coolant is conveyable, by means of the first coolant pump and the second coolant pump, in a seventh coolant circuit that includes the traction motor, the bypass to the ambient heat exchanger, and the traction battery. Accordingly, an operation of the cooling system based on the fifth functional position of the distribution system may differ from that based on the fourth functional position solely in that coolant (primarily or completely) flows through the bypass to the ambient heat exchanger. An operation of the cooling system based on this fifth functional position may be meaningful, for example, when there is already a cooling power requirement for the traction battery, and at the same time the traction motor has not yet reached its intended operating temperature range, so that thermal energy, which during the flow through (the cooling channels of) the traction battery is transferred to the coolant flowing through the seventh coolant circuit for heating up the traction motor and/or other components that are likewise integrated into this seventh coolant circuit, may be utilized.

Additional components that are integrated into the cooling system of a motor vehicle according to the invention may in particular be a DC-DC converter (or one or more cooling channels thereof), and/or a charging device (or one or more cooling channels thereof) for the traction battery, and/or power electronics (or one or more cooling channels thereof). These components may preferably be integrated
  into the first coolant circuit in the first functional position and/or
  into the third coolant circuit in the second functional position and/or
  into the fifth coolant circuit in the third functional position and/or
  into the sixth coolant circuit in the fourth functional position and/or
  into the seventh coolant circuit in the fifth functional position.

Furthermore, the electric motor vehicle according to the invention is preferably an electric vehicle in which the travel drive power to be applied for moving the motor vehicle is consequently generated solely by the electric traction motor and optionally by one or more further electric traction motors. Alternatively, the electric motor vehicle may be a hybrid vehicle which in addition to at least one/the electric traction motor also has an internal combustion engine that is likewise provided for generating, at least temporarily, travel drive power for the motor vehicle.

The indefinite articles "a" and "an," in particular in the claims and in the description providing a general explanation of the claims, are understood as such, and not as numerals. Accordingly, for components specified in this way it is understood that the components are present at least singly, and may be present in multiples.

BRIEF DESCRIPTION OF THE DRAWINGS

The invention is explained in greater detail below with reference to one exemplary embodiment illustrated in the drawings, which show the following, in each case in a schematic illustration.

DETAILED DESCRIPTION OF THE INVENTION

Figure 1:
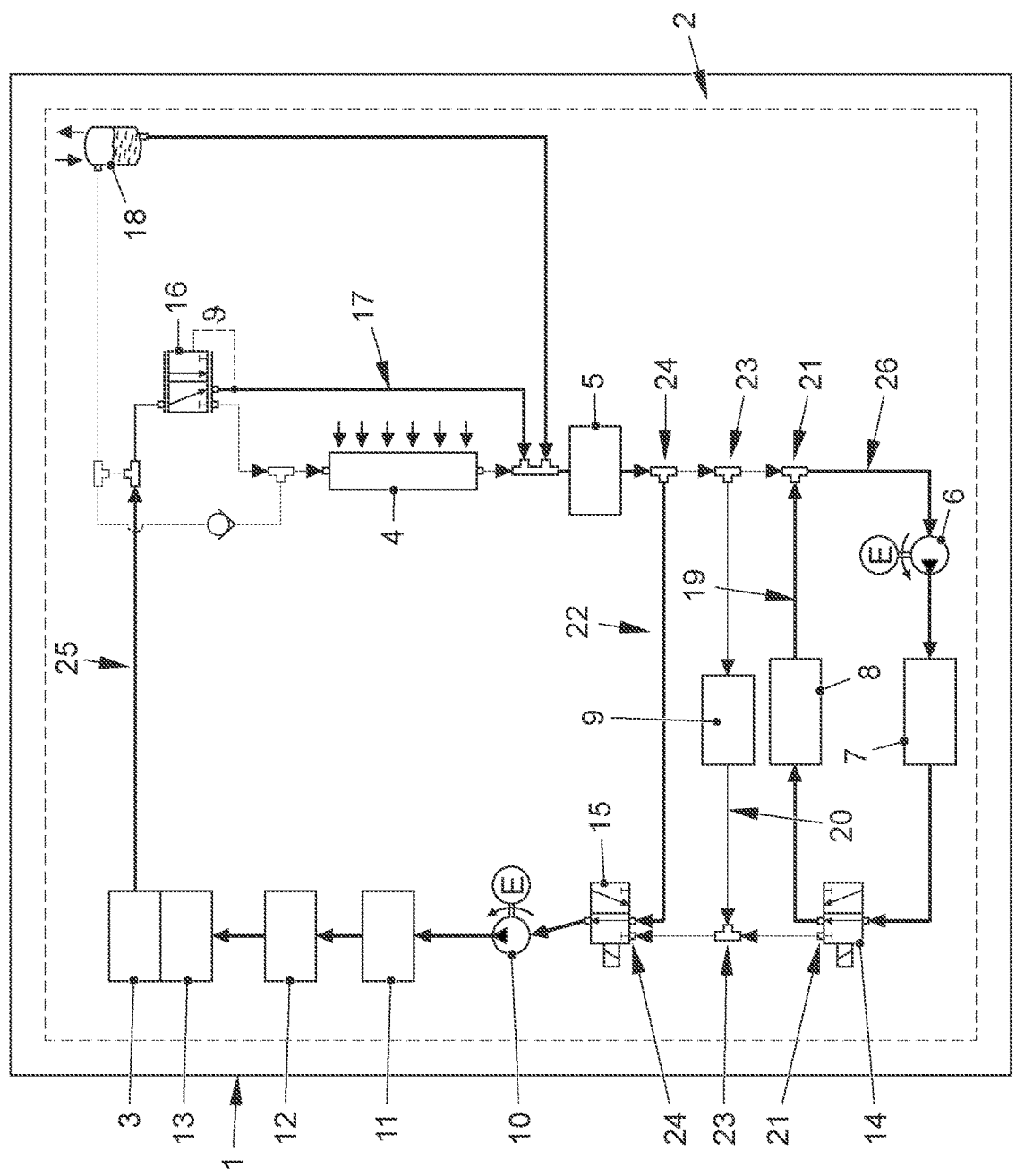
FIG. 1: shows a motor vehicle according to the invention during an operation of the associated cooling system based on a third functional position of a distribution system of the cooling system.

FIGS. 1 through 5 show in greatly simplified illustrations a motor vehicle 1 according to the invention with a cooling system 2. The cooling system 2 includes, as components to be integrated, an electric traction motor 3, an ambient heat exchanger 4, a DC-DC converter 5, a second electric coolant pump 6, a traction battery 7, an electric coolant heater 8, a coolant-refrigerant heat exchanger 9 of an air conditioner (not illustrated), a first electric coolant pump 10, a first charging device 11, based on inductive energy transfer, for charging the traction battery 7, a second charging device 12 for charging the traction battery 7, in which an electrically conductive connection to an electrical energy source is to be established by means of a plug-in connection, and power electronics 13, associated with the traction motor 3, which may in particular include a pulse-controlled inverter. These components of the cooling system are [connected] by a plurality of coolant lines and by means of a distribution system that as a whole includes two 3/2-way switching valves 14, 15, and a thermostat valve 16 that may be designed, for example, in the form of a purely passive valve that is actuated by means of an expansion element. In addition, a bypass 17 to the ambient heat exchanger 4 is provided, wherein a controller of the flow of coolant across the ambient heat exchanger 4 and/or the bypass 17 is controllable by means of the thermostat valve 16. For example, it may be provided that the thermostat valve 16 begins to open at a temperature of approximately 15° C. of coolant contacting it (and thus, of its expansion element), and is completely open at a temperature of approximately 25° C. At a temperature of less than approximately 15° C. of the coolant contacting the thermostat valve 16, the entire volume flow of the coolant arriving at the thermostat valve 16 is thus led across the bypass 17, and at a temperature above approximately 25° C. is completely led across the ambient heat exchanger 4. In contrast, a temperature-dependent division takes place at a temperature between 15° C. and 25° C. The cooling system also has a compensation tank 18 in a known manner.

The interconnection of the components by means of the coolant lines and the two switching valves 14, 15 is selected in such a way that the traction motor 3, the combination of the ambient heat exchanger 4 and the associated bypass 17, the DC-DC converter 5, the second coolant pump 6, the traction battery 7, the first coolant pump 10, the first charging device 11, the second charging device 12, and the power electronics 13 are integrated in series into a main circuit of the cooling system, and consequently the same coolant would flow through them in a coolant circuit corresponding to the main circuit. In addition, the interconnection is selected in such a way that flow (in series) always takes place through the traction motor 3, the DC-DC converter 5, and the charging devices 11, 12 during operation of at least the first coolant pump 10. These components of the cooling system are also referred to below as high-temperature cooling components for simplification.

In contrast, the coolant heater 8 is integrated into a first short-circuit line 19 that bridges a section of the main circuit that includes the traction battery 7 and the second coolant pump 6. In addition, the coolant-refrigerant heat exchanger 9 is integrated into a second short-circuit line 20 that bridges a section of the main circuit that integrates the traction battery 7, the second coolant pump 6, and the branches 21 to the first short-circuit line 19. Furthermore, a third short-circuit line 22 is provided that branches a section of the main circuit that integrates the traction battery 7, the second coolant pump 6, the branches 21 to the first short-circuit line 19, and the branches 23 to the second short-circuit line 20. A first (14) of the switching valves 14, 15 of the distribution system is integrated into the branch 21 of the main circuit to the first short-circuit line 19 situated downstream from the conveying direction provided for the second coolant pump 6. Coolant coming from the traction battery 7 is led either along the main circuit or into the first short-circuit line 19, depending on the switching position of this first switching valve 14. The second (15) of the switching valves 14, 15 of the distribution system is integrated into the branch 24 of the main circuit to the third short-circuit line 22 situated on the intake side of the first coolant pump 10. Coolant coming from the DC-DC converter 5 is led either further along the main circuit or into the third short-circuit line 22, depending on the switching position of this second switching valve 15.

FIGS. 1 through 5 show the same cooling system in different operating modes based on various functional positions of the distribution system or of the switching valves 14, 15 and the thermostat valve 16. The coolant lines (including the bypass 17) via which relevant volume flows of the coolant are led in the respective operating modes are illustrated with thicker lines, compared to the coolant lines for which this does not apply.

FIG. 1 shows an operation of the cooling system based on a third functional position of the distribution system. Coolant is conveyed, by means of the first coolant pump 10, in a fifth coolant circuit that includes (solely) the high-temperature cooling components and the bypass 17 to the ambient heat exchanger 4. In addition, coolant is conveyed, by means of the second coolant pump 6, in the second coolant circuit 26, which is separate from the fifth coolant circuit 25 and which includes solely the traction battery 7 and the coolant heater 8. Such an operation of the cooling system is provided after a cold start of the motor vehicle 1 at relatively low ambient temperatures and therefore also at low cell temperatures of the traction battery 7 (<0° C., for example, depending on the specific type of battery cell), so that there is a heat output requirement for the traction battery 7 in order to heat it as rapidly as possible until reaching at least a lower limit of an operating temperature range provided for it. This is achieved by circulating coolant in the second coolant circuit 26, in which thermal energy is transferred from the coolant heater 8 to the coolant, and from the coolant to the traction battery 7. At the same time, coolant is conveyed in the fifth coolant circuit 25, as the result of which thermal energy is transferred in particular from the traction motor 3, the DC-DC converter 5, and the power electronics 13 to the coolant flowing in the fifth coolant circuit 25 in order to heat the coolant.

Figure 2:
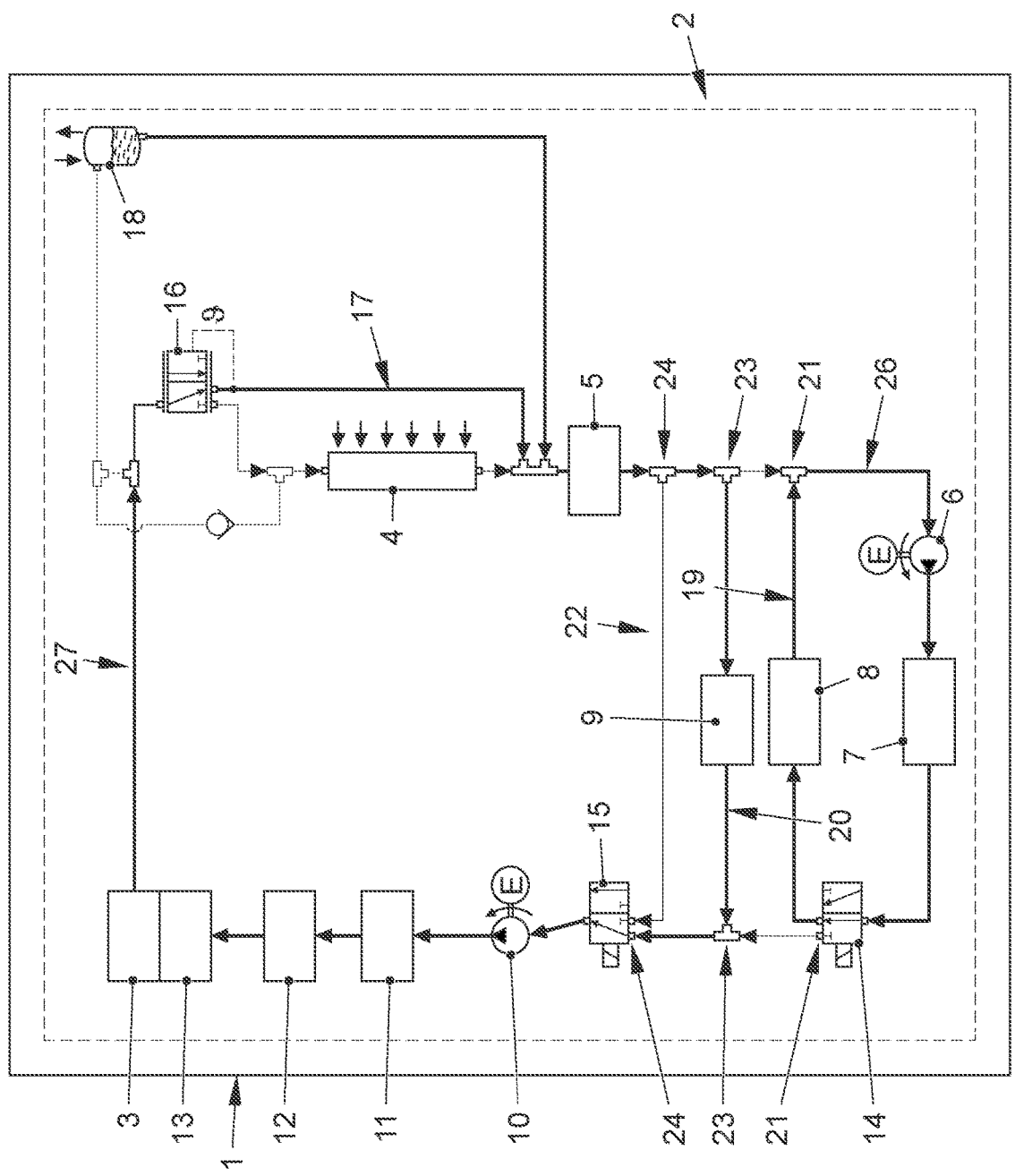
FIG. 2: shows the motor vehicle during an operation of the cooling system based on a first functional position of the distribution system.

As soon as this coolant flowing through the fifth coolant circuit 25 has reached a sufficiently high temperature, a switch may be made to an operation of the cooling system based on a first functional position according to FIG. 2. Alternatively, however, an operation of the cooling system based on the first functional position directly after a cold start of the motor vehicle 1 at relatively low ambient temperatures, and therefore also at low cell temperatures, is also possible.

The operation based on the first functional position according to FIG. 2 differs from that according to FIG. 1 solely in that, due to switching the second switching valve 15, the coolant previously circulated in the fifth coolant circuit 25 no longer flows through the third short-circuit line 22, and instead flows through the second short-circuit line 20 that includes the coolant-refrigerant heat exchanger 9, and thus circulates within a first coolant circuit 27. The sufficiently heated coolant that flows in this first coolant circuit 27 is then utilized to transfer thermal energy in the coolant-refrigerant heat exchanger 9 to a refrigerant of a cycle apparatus of the air conditioner, and the cycle apparatus may be operated as a heat pump in order to heat air, which is to be supplied to an interior of the motor vehicle 1, as well as possible.

Figure 3:
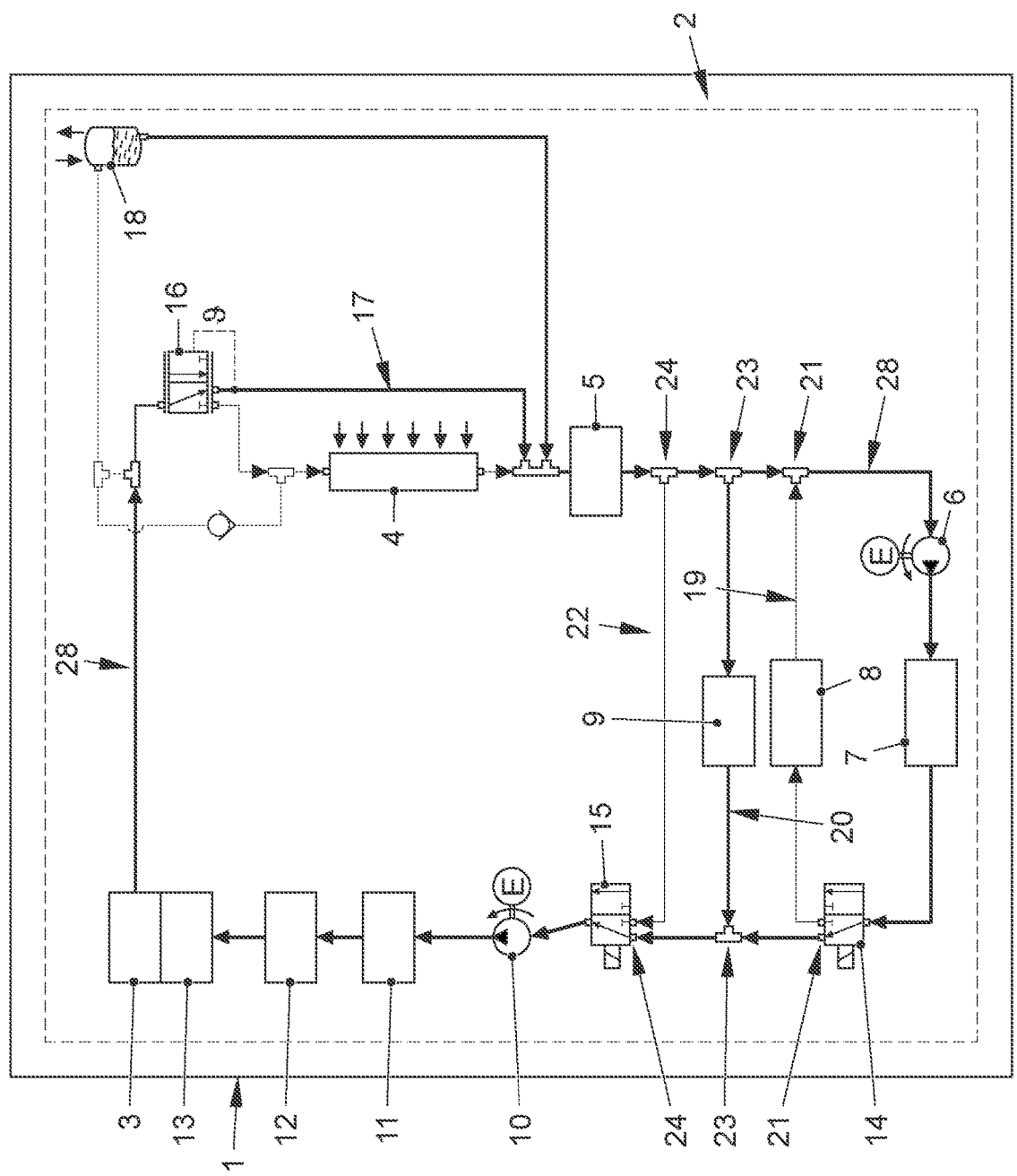
FIG. 3: shows the motor vehicle during an operation of the cooling system based on a fifth functional position of the distribution system.

During an operation of the cooling system based on the fifth functional position of the distribution system according to FIG. 3, coolant is conveyed, by means of the two coolant pumps 6, 10, in a seventh coolant circuit 28 that corresponds to the main circuit with the bypass activated. At the same time, a relatively low but not insignificant quantity of coolant may flow across the second short-circuit line 26 and the coolant-refrigerant heat exchanger 9 integrated therein. However, since the air conditioner may be deactivated during such an operation of the cooling system, there is no, or only insignificant, transfer of thermal energy from the coolant to the refrigerant of the air conditioner. Such an operation of the cooling system may follow an operation based on the first functional position according to FIG. 2 where there is already a cooling power requirement for the traction battery 7, and at the same time the traction motor 3, the power electronics 13, and/or the DC-DC converter 5 have/has not yet reached an operating temperature range intended in each case, so that thermal energy that is transferred to the coolant flowing through the seventh coolant circuit 28 when flow takes place through cooling channels of the traction battery 7 may be utilized for heating these components.

Figure 4:
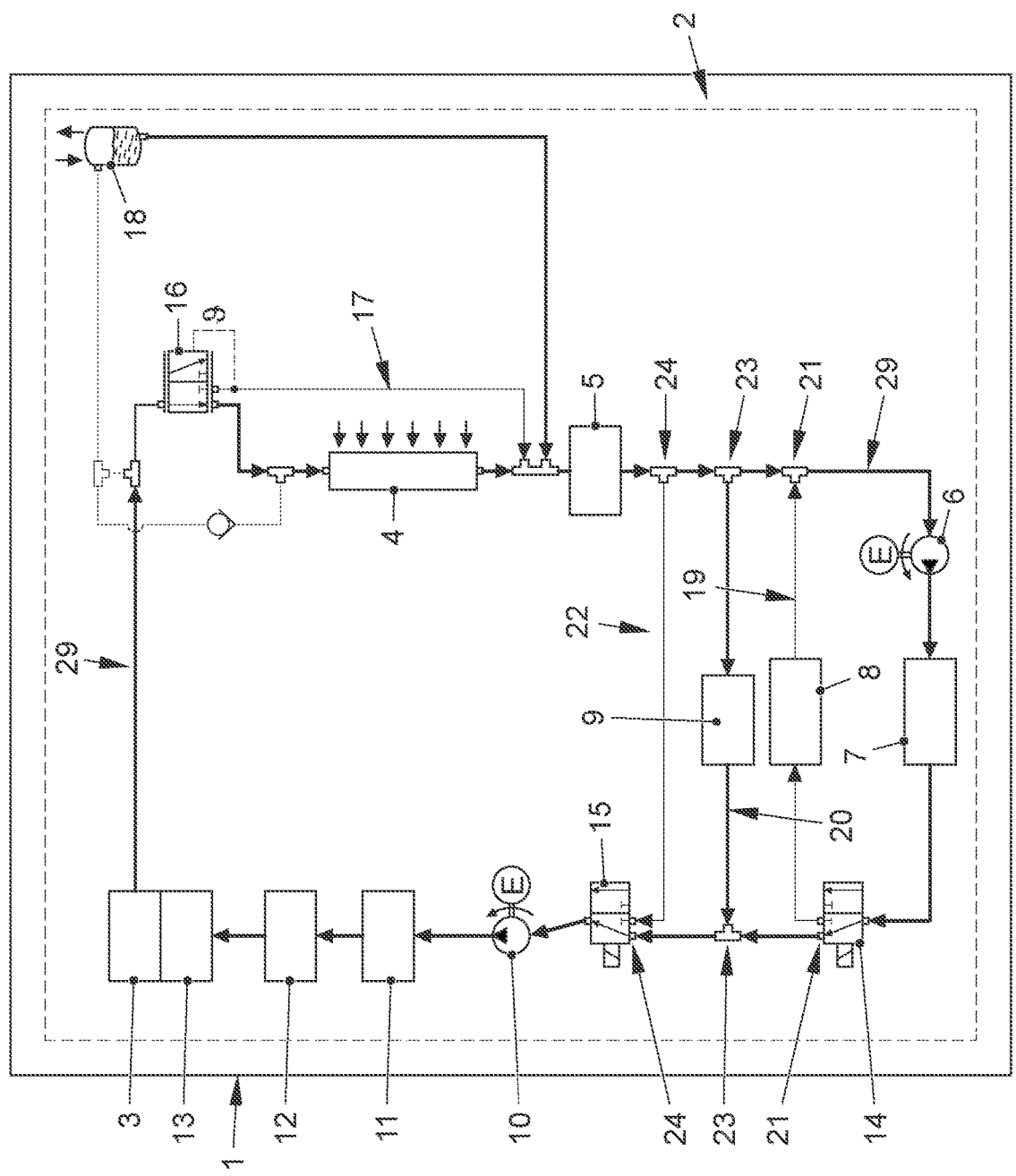
FIG. 4: shows the motor vehicle during an operation of the cooling system based on a fourth functional position of the distribution system.
Figure 5:
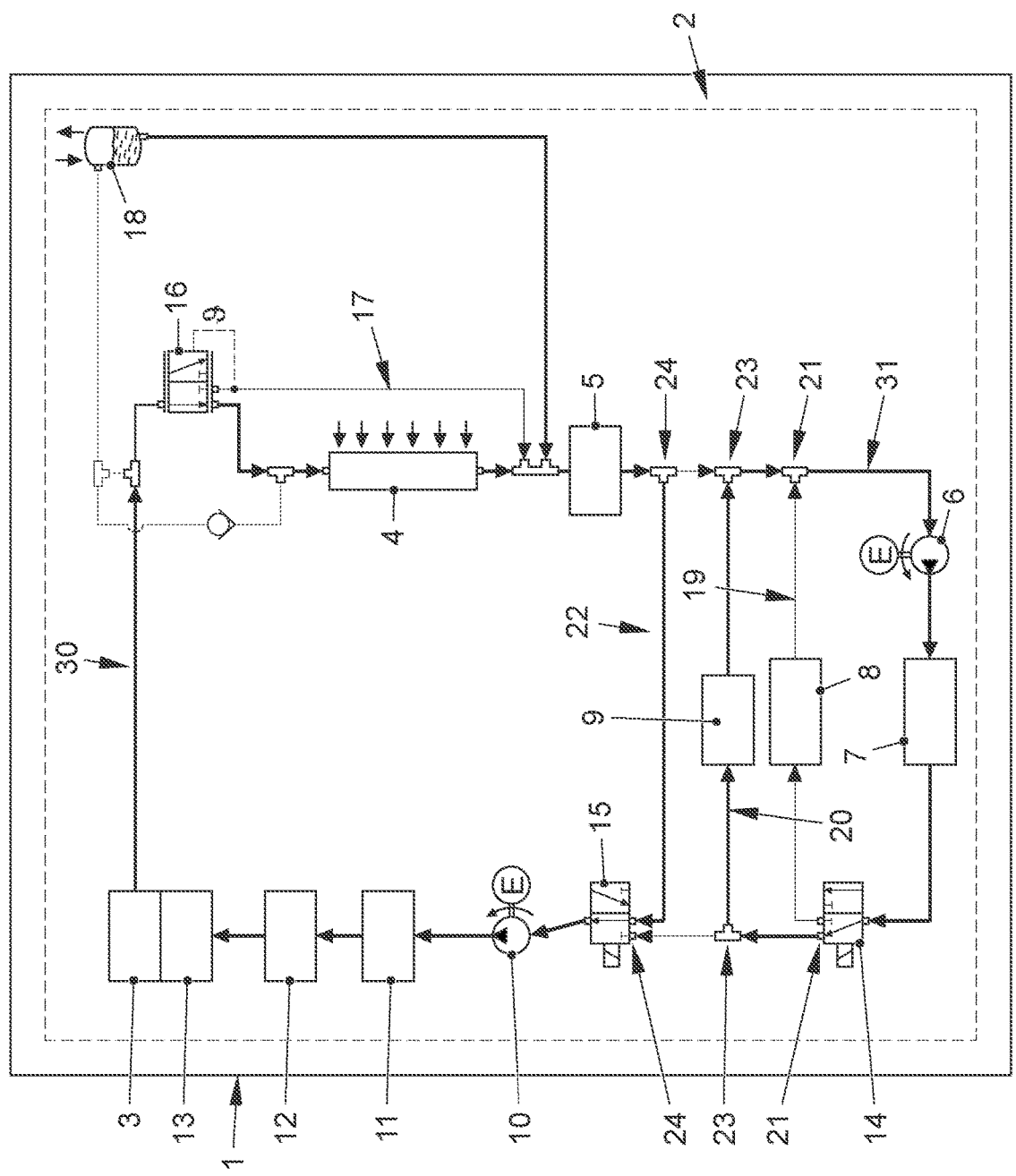
FIG. 5: shows the motor vehicle during an operation of the cooling system based on a second functional position of the distribution system.

An operation of the cooling system based on the fifth functional position of the distribution system according to FIG. 3 may be followed by an operation based on a fourth functional position according to FIG. 4. This operation differs from that according to FIG. 3 solely in that the coolant is now conveyed, at least partially and preferably completely, across the ambient heat exchanger 4. All of the components to be cooled which are integrated into the cooling system are then cooled by means of the same coolant that is led through these components in series during flow through a corresponding sixth coolant circuit 29, and the thermal energy thus transferred to the coolant, provided that it is not partially utilized by operating the air conditioner for heating the interior of the motor vehicle, is discharged to the ambient air as waste heat via the ambient heat exchanger 4.

An operation of the cooling system based on the fourth functional position according to FIG. 4 may be provided continuously or as a normal operating mode, as a function of the power requirement for the traction motor 3 and thus also for the traction battery 7 and as a function of the ambient temperature, after the components of the cooling system to be cooled have reached their respective intended operating temperature ranges. On the other hand, the cooling power that is achievable for the traction battery 7 during an operation based on the fourth functional position according to FIG. 4, at a relatively high ambient temperature and/or with a relatively high cooling power requirement for the traction motor and the traction battery, may not be sufficient, at least for a temporary period, to maintain the upper limit value of the operating temperature range intended for the traction battery 7. In this case, a switch may be made to an operation of the cooling system based on the second functional position of the distribution system according to FIG. 5. By appropriately switching the second switching valve 15, coolant is then conveyed, by means of the first coolant pump 10, in a third coolant circuit 30 which, in addition to the first coolant pump 10, includes solely the high-temperature cooling components and the ambient heat exchanger 4, and in addition coolant is conveyed, by means of the second coolant pump 14, in a fourth coolant circuit 31, separate from the third coolant circuit 30, that includes the traction battery 7 and the coolant-refrigerant heat exchanger 9. The air conditioner, which includes the coolant-refrigerant heat exchanger 9, at the same time is operated as a refrigeration unit and thus generates particularly high cooling power for cooling the traction battery 7.

LIST OF REFERENCE NUMERALS 1 motor vehicle
2 cooling system
3 traction motor
4 ambient heat exchanger
5 DC-DC converter
6 second coolant pump
7 traction battery
8 coolant heater
9 coolant-refrigerant heat exchanger
10 first coolant pump
11 first charging device
12 second charging device
13 power electronics
14 first switching valve
15 second switching valve
16 thermostat valve
17 bypass to the ambient heat exchanger
18 compensation tank
19 first short-circuit line
20 second short-circuit line
21 branch to the first short-circuit line
22 third short-circuit line
23 branch to the second short-circuit line
24 branch to the third short-circuit line
25 fifth coolant circuit 26 second coolant circuit
27 first coolant circuit
28 seventh coolant circuit
29 sixth coolant circuit
30 third coolant circuit
31 fourth coolant circuit

The invention claimed is:

1. A motor vehicle with a cooling system, comprising:
a first coolant circuit that includes an electric traction motor, a bypass to an ambient heat exchanger, and a coolant-refrigerant heat exchanger of an air conditioner;
a second coolant circuit, separate from the first coolant circuit, that includes a traction battery and a coolant heater;
a third coolant circuit that includes the traction motor and the ambient heat exchanger;
a fourth coolant circuit, separate from the third coolant circuit, that includes the traction battery and the coolant-refrigerant heat;
a first coolant pump; and
a second coolant pump;
wherein the traction motor, the ambient heat exchanger, the bypass to the ambient heat exchanger, the traction batter, the coolant heater, the coolant-refrigerant heat exchanger, the first coolant pump, and the second coolant pump are directly or indirectly connected or connectable to one another via coolant lines and a distribution system,
wherein, in a first functional position of the distribution system,
the first coolant pump is configured to convey coolant in the first coolant circuit, and
the second coolant pump is configured to convey coolant in the second coolant circuit, and
wherein, in a second functional position of the distribution system,
the first coolant pump is configured to convey coolant in a third coolant circuit, and
the second coolant pump is configured to convey coolant in a fourth coolant circuit.

2. The motor vehicle according to claim 1, further comprising a fifth coolant circuit, which is separate form the second coolant circuit, that includes the traction motor and the bypass to the ambient heat exchanger;
wherein, in a third functional position of the distribution system,
the first coolant pump is configured to convey coolant in the fifth coolant circuit, and
the second coolant pump is configured to convey coolant in the second coolant circuit.

3. The motor vehicle according to claim 1, further comprising a sixth coolant circuit that includes the traction motor, the ambient heat exchanger, and the traction battery;
wherein, in a fourth functional position of the distribution system, the first coolant pump and the second coolant pump are configured to convey coolant in the sixth coolant circuit.

4. The motor vehicle according to claim 1, further comprising a seventh coolant circuit that includes the traction motor, the bypass to the ambient heat exchanger, and the traction battery;
wherein, in a fifth functional position of the distribution system, the first coolant pump and the second coolant pump are configured to convey coolant in the seventh coolant circuit.

5. The motor vehicle according to claim 1, further comprising a DC-DC converter and/or a charging device and/or power electronics that are/is integrated:
into the first coolant circuit in the first functional position; and/or
into the third coolant circuit in the second functional position.

6. The motor vehicle according to claim 1, further comprising:
a main circuit that integrates in series the traction motor, the combination of the ambient heat exchanger and the associated bypass, the traction battery, the first coolant pump, and the second coolant pump,
a first short-circuit line that integrates the coolant heater and that bridges a section of the main circuit that integrates the traction battery and the second coolant pump, and
a second short-circuit line that integrates the coolant-refrigerant heat exchanger and that bridges a section of the main circuit that integrates the traction battery, the second coolant pump, and the branches to the first short-circuit line,
wherein a first distribution device of the distribution system is integrated into at least one branch to the first short-circuit line and/or to the second short-circuit line.

7. The motor vehicle according to claim 6, further comprising:
a fifth coolant circuit, which is separate from the second coolant circuit, that includes the traction motor and the bypass to the ambient heat exchanger; and
a third short-circuit line that bridges a section of the main circuit that integrates the traction battery, the second coolant pump, the branches to the first short-circuit line, and the branches to the second short-circuit line
wherein in a third functional position of the distribution system,
the first coolant pump is configured to convey coolant in the fifth coolant circuit, and
the second coolant pump is configured to convey coolant in the second coolant circuit.

8. The motor vehicle according to claim 7, further comprising a second distribution device of the distribution system that is integrated into at least one branch to the third short-circuit line.

9. The motor vehicle according to claim 1, wherein the motor vehicle is an electric vehicle.

10. The motor vehicle according to claim 1, wherein the second coolant circuit does not include the coolant-refrigerant heat exchanger.

11. The motor vehicle according to claim 2, further comprising a DC-DC converter and/or a charging device and/or power electronics that are/is integrated into the fifth coolant circuit in the third functional position.

12. The motor vehicle according to claim 3, further comprising a DC-DC converter and/or a charging device and/or power electronics that are/is integrated into the sixth coolant circuit in the fourth functional position.

13. The motor vehicle according to claim 4, further comprising a DC-DC converter and/or a charging device and/or power electronics that are/is integrated into the seventh coolant circuit in the fifth functional position.

* * * * *